United States Patent

Tyson et al.

[15] 3,670,630
[45] June 20, 1972

[54] RESILIENT CONNECTING MEANS

[72] Inventors: Henry K. Tyson; Karl W. Wikelski, both of Odessa, Tex.

[73] Assignee: Dart Industries, Inc., Los Angeles, Calif.

[22] Filed: Dec. 15, 1969

[21] Appl. No.: 884,999

[52] U.S. Cl..............................92/129, 92/187, 287/20 P, 308/72
[51] Int. Cl..........................................F16j 1/14, F16c 9/00
[58] Field of Search..................92/187, 129, 256; 287/20 P; 308/72, 172

[56] References Cited

UNITED STATES PATENTS

| | | | |
|---|---|---|---|
| 2,886,380 | 5/1959 | Lambeek | 308/72 |
| 3,014,767 | 12/1961 | Thrasher et al. | 308/72 |
| 1,456,727 | 5/1923 | Franchi | 92/187 X |
| 1,543,498 | 6/1925 | Hammond | 92/187 |
| 1,866,057 | 7/1932 | Reid | 92/187 X |
| 2,695,500 | 11/1954 | Price | 92/187 X |
| 3,113,491 | 12/1963 | Borowka | 92/187 X |

FOREIGN PATENTS OR APPLICATIONS 244,387  3/1912  Germany.................................308/72

Primary Examiner—Martin P. Schwadron
Assistant Examiner—Irwin C. Cohen
Attorney—Fred S. Valles and Richard A. Dannells, Jr.

[57] ABSTRACT

A connecting means is disclosed for resiliently connecting an elongate member to a driving means for imparting motion to the elongate member and is particularly suitable for connecting piston rods to driving heads of compressor systems. The connecting means includes a shoulder means adapted to be secured to the elongate member adjacent that end of the member to be secured to the driving means, a retaining means adapted to be secured to the driving means and which encompasses both the shoulder means and elongate member in spaced apart relationship, and a resilient member interposed between the retaining means and shoulder means for urging the shoulder means and elongate member toward the driving means.

7 Claims, 4 Drawing Figures

INVENTORS.
KARL W. WIKELSKI
BY HENRY K. TYSON
ATTORNEY

FIG. 2
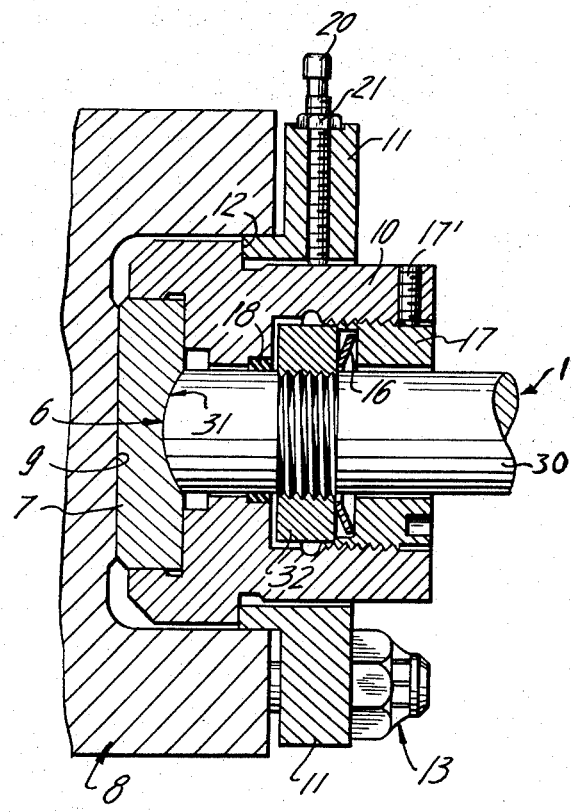
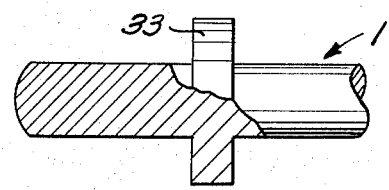
FIG. 4
INVENTORS.
KARL W. WIKELSKI
HENRY K. TYSON
BY
ATTORNEY

INVENTOR
KARL W. WIKELSKI
HENRY K. TYSON
BY
ATTORNEY

RESILIENT CONNECTING MEANS

This invention relates to a connecting means for resiliently connecting a rod or arm to a driving means for imparting motion thereto and, in particular, a means for resiliently connecting a compressor piston rod or plunger to a reciprocating driving head or yoke of a compressor system.

In a conventional compressor system wherein the piston rods or plungers are mounted in such a manner that their free ends extend through a sealing means into the compressor cylinders while their opposite ends are rigidly connected to a reciprocating driving head or yoke. Even though the piston rods, compressor cylinders, driving means, and the like are precision manufactured in accordance with close tolerances there nevertheless results certain dimensional variations which lead to alignment problems after assembly of the compressor systems. These alignment problems are further compounded by the human element in assembling such systems. Moreover, additional alignment problems occur during operation of the compressor system due to vibrations inherently created by the moving parts. These alignment problems contribute to certain angular and eccentric misalignments of the piston rods between the compressor cylinders and the driving means and are not free to angularly or eccentrically displace within the compressor cylinders, some rather large bending stresses may build up in the piston rods due to these misalignments, thus leading to potential failure. Additional stresses are also incurred in the piston rings, packings and cylinder walls thereby shortening their useful lives.

In accordance with this invention there is provided a means for resiliently connecting these piston rods to the driving heads or yokes to permit toleration of both angular and eccentric misalignments and substantially reduce or eliminate bending stresses in the piston rods during operation of the compressor system. The invention also aids in aligning the piston rod or plunger within the compressor cylinder thus reducing wear incurred by the piston rings, packings and cylinder walls due to misalignments. The invention is applicable to compressor systems, particularly the high pressure type, wherein the piston rod is of the plunger type as well as the type having a terminal portion with rings and seals mounted thereon. Examples of both types of piston rods are described in U.S. Pat. No. 3,128,941.

The various features and advantages of the invention will be apparent from the drawings wherein FIG. 1 is a partial cross-sectional view of a connection between the end of a piston rod and the crosshead or yoke of a compressor driving means depicting the resilient connecting means of the invention holding the end of a piston rod to the driving head or yoke of a compressor system while the other end of the piston rod is operably positioned within a compression cylinder.

FIGS. 2 and 3 are partial cross-sectional views similar to FIG. 1 but depicting other embodiments of the resilient connecting means of the invention.

FIG. 4 is a partial cross-sectional view depicting a further embodiment of a piston rod having an integral shoulder means.

Figure 1:
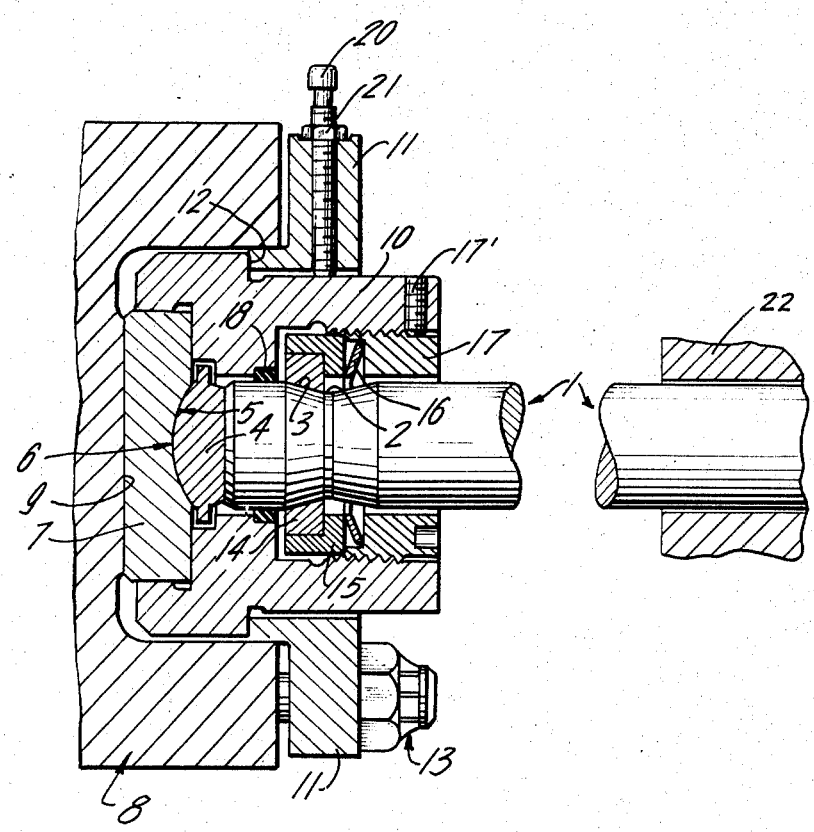

With particular reference to FIG. 1 there are shown portions of a conventional compressor piston rod 1, such as one made of tungsten carbide One end portion of the piston rod 1 is operably positioned within a compression cylinder 22 while the other end portion has, the usual notched portion 2 with a beveled retaining surface 3 and end cap 4 having a substantially spherical surface 5 for seating into a mating surface 6 of a thrust block 7. The thrust block 7 is positioned within a receiving cavity of the driving head 8 and abuts against a mounting face 9 of the head. The thrust block is movable over the mounting face of the driving head to permit positioning and alignment of the piston rod relative to the compression cylinder, all of which will be apparent from the description to follow.

The above described elements are conventional features of the connection between the end of a piston rod and the driving head or yoke of a compressor system and, thus, further description or illustration is not considered necessary. It is pointed out, however, that during operation of the compressor system the entire assembly shown in the drawing moves in unison in a reciprocating manner to cause the piston rod to reciprocate within the compressor cylinder. The reciprocating movement is provided by some conventional power means coupled to the driving head which in turn transmits this movement through the thrust block to the piston rod which is held in place by the resilient connecting means of this invention.

In general, the resilient connecting means of this invention includes a shoulder means adapted to be secured to the piston rod adjacent its end, a retaining means encompassing the shoulder means in spaced apart relationship and adapted to be secured to the driving head or yoke of the compressor system, and a resilient member interposed between the retaining means and the shoulder means for resiliently urging the piston rod toward the driving head whereby the end of the piston rod is seated against the thrust block of the driving head. Since the retaining means encompasses the shoulder means in spaced apart relationship, the resilient member permits limited angular and eccentric displacement of the piston rod and shoulder means relative to the driving head and retaining means. As a result, bending stresses in the piston rod due to misalignments are substantially reduced or eliminated and corresponding stresses at the other end of the piston rod in the compressor cylinder are reduced.

Again with particular reference to the embodiment shown in FIG. 1, the shoulder means includes a collar 14 which has an internal beveled surface for mating with the beveled retaining surface 3 of the notched section of the piston rod. The angularity of the mating beveled surfaces is such that the collar 14 exerts a clamping action on the piston rod and urges the piston rod into seating engagement with the thrust block 7 when the resilient connecting means of this invention is installed. Preferably, the collar 14 is split so as to form two segments or halves which may easily be assembled around the beveled retaining surface 3 of the piston rod. A retainer ring 15 is provided to maintain the collar 14 in place around the piston rod. Thus, the combination of the collar and retainer ring forms a shoulder around the end of the piston rod.

The retaining means includes a positioning gland 10 which encompasses the end of the piston rod and engages the thrust block 7 positioned within the driving head cavity. A retaining collar 11 is secured to the outer face of the driving head adjacent the cavity and internally engages a shoulder 12 around the outer periphery of the positioning gland to hold the gland in place within the driving head cavity. Any conventional means may be used to secure the collar 11 to the driving head, such as a nut and bolt system 13. The engagement between the positioning gland and the thrust block 7 is such that the two elements are movable as a single unit relative to the mounting face 9 of the driving head. The external dimensions of the gland are somewhat smaller than the cavity so as to be laterally movable therein to some degree. The internal dimensions of the gland are larger than the diameter of the end of the piston rod and the shoulder means secured thereto so that there is sufficient space to permit limited angular and eccentric movement of the piston rod relative to the gland.

Disposed between the shoulder means and the retaining means is a resilient member, such as a Belleville spring illustrated in the drawing at 16, backed by an internal shoulder of the gland such as nut 17 which threadedly engages the gland 10, and also forms a part of the retaining means. The internal nut may be locked in place by lock screw 17' or other suitable means. In this manner the end cap 4 of the piston rod is resiliently urged in seating engagement against the thrust block 7. While a Belleville spring has been illustrated as the resilient member, it should be understood that any equivalent resilient means may be employed in its place, e.g. a series of coil springs, an elastomeric ring, a circular spring positioned against a beveled surface, and the like.

It is also desirable to provide a deformable insert 18 for positioning the piston rod relative to the gland thereby aiding in initially aligning the piston rod between the driving head and the compressor cylinder. This insert is made of some readily deformable material which may also be resilient. Suitable materials include plastics such as bronze, lead, and alloys thereof. The insert may be conveniently positioned between the gland 10 and the piston rod at a point between the shoulder means and the end cap 4 of the piston rod. It is pointed out, however, that the insert is optional and merely aids in initial alignment.

Prior to operation of the compressor system, with one end of the piston rod connected to the driving head as illustrated in FIG. 1 and the other end of the piston rod operably extending into a compressor cylinder, the piston rod may be initially aligned at driving head connection so that there are substantially minimal or no bending stresses in the piston rod as it reciprocates. The alignment may conveniently be carried out with one or more adjusting screws 20 located around the periphery of the retaining collar 11. Adjustment of these screws permits lateral movement of the positioning gland 10, thrust block 7 and the resiliently connected end of the piston rod as a single unit within the cavity of the driving head. Once initial alignment is achieved the nuts securing the retaining collar 11 to the driving head are tightened to clamp the gland 10 and thrust block 7 within the cavity and against the mounting face 9 of the driving head. Then the adjusting screws may be locked in place by lock nuts 21.

Now then, after the compressor system is put into operation small angular and eccentric deviations of the piston rod from its initially aligned position occur as a result of the previously mentioned misalignments. These deviations are tolerated by the resilient connecting means and thereby potential bending stresses within the piston rod are substantially avoided. In the event the deformable insert is employed it will readily deform under the influence of the piston rod deviations so as not to override the effects of the resilient connecting means. Since the deformable insert is present solely for purposes of aiding initial alignment during installation, it is of no consequence that the insert becomes deformed during operation of the compressor system. However, the use of a resilient insert will avoid permanent deformation and be reusable for subsequent alignments.

Another embodiment of the present invention is shown in FIG. 2 with a slightly different, but also conventional, piston rod or plunger. All of the various parts shown are identical to those described in connection with FIG. 1 with the exception of the piston rod and the shoulder means. In this embodiment the piston rod 30 is provided with an integral spherical surface 31 which mates with the spherical surface 6 of thrust block 7. Thus, no end cap is required. In addition, rather than having a notched portion the end of the piston rod is provided with a threaded area. The shoulder means 32, which merely comprises a ring, is threaded onto the piston rod thereby serving the same function as the combination split collar 14 and retainer ring 15 shown in FIG. 1. There may be means provided to lock this shoulder means in place on the piston rod.

While the shoulder means 32 is shown as being threaded onto the end of the piston rod 30 it should be understood that such means may also be formed as an integral portion of the piston rod as shown by shoulder means 33 depicted in FIG. 4,.

Figure 3:
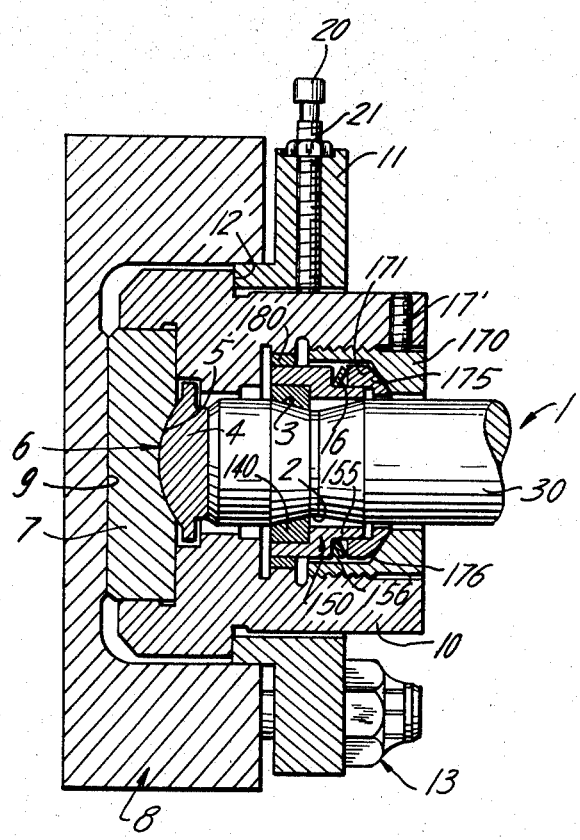

In FIG. 3 there is illustrated another embodiment of the invention. Again, the various parts are identical to those described in connection with FIG. 1 with the exception of certain design changes in the shoulder means and the retaining means.

Specifically, the shoulder means includes a split collar 140 (similar to split collar 14 in FIG. 1) which is surrounded by a retainer ring 150 having an axially extending flange 155. The split collar 140 and retainer ring 150 function in the same manner as the corresponding parts in FIG. 1 but, in addition, the flange 155 serves to locate resilient member 16.

As for the retaining means it will be seen that rather than an internal nut 17 (FIG. 1) alone to back the resilient member 16 there is provided a two-piece arrangement of an internal nut portion 170 having an inclined inner surface 171 and a backing ring 175 having a spherical surface 176. The spherical surface of the backing ring rides against the inclined surface of the internal nut portion. The opposite side of the backing ring 175 engages the flange 155 of the retainer ring 150 and serves to back resilient member 16 disposed between shoulder 156 of the retainer ring 150 and the inner surface of the backing ring.

With this embodiment there is also a relocation of the deformable insert. As illustrated, the insert 180 is positioned between the gland 10 and the retainer ring 150 for initial alignment. The use of insert 180 with this arrangement is recommended.

Thus having described the invention in detail it will be understood that certain variations and modifications will be apparent to those skilled in the art and may be made without departing from the spirit and scope of the invention as described herein or in the appended claims. In particular, it is pointed out that while the resilient connecting means of this invention has been described and illustrated in connection with a compressor system it may obviously be employed in any system which involves connecting an elongate member, such as a rod or arm, to a driving means, whether it be reciprocating, pushing or pulling.

We claim:

1. A connecting means for resiliently connecting an elongate member to a driving means for imparting motion to said elongate member comprising shoulder means secured to the elongate member adjacent that end to be connected to the driving means; retaining means comprising a gland surrounding the shoulder means and the elongate member in spaced apart relationship, said gland having an internal shoulder, said internal shoulder of said gland is provided by an internal nut portion threadedly engaging said gland, and a retaining collar secured to the driving means which surrounds and holds the gland in place; and a resilient member interposed between the internal shoulder of the retaining means and the shoulder means for resiliently urging the shoulder means toward the driving means and thereby tending to maintain abutting engagement between the end of the elongate member and the driving means, said internal nut portion has an inner inclined surface and a backing ring having a spherical surface riding against the inclined surface for engaging said resilient member.

2. A connecting means according to claim 1 wherein means are provided for adjusting the relative lateral position between the gland and the surrounding retaining collar.

3. In a compressor system which includes a compression cylinder, a reciprocating driving head and an elongate member having one end operably positioned within the compression cylinder and the other end operably connected to the reciprocating driving head, the improvement therein comprising a connecting means for resiliently connecting the elongate member to the driving head to permit angular and eccentric movement of said elongate member relative to said driving head during operation of the compressor system whereby bending stresses in the elongate member are substantially reduced, said connecting means including shoulder means secured to the elongate member adjacent that end being connected to the driving head; retaining means comprising a gland surrounding the shoulder means and the elongate member in spaced apart relationship, said gland having an internal shoulder, and a retaining collar secured to the driving means which surrounds and holds the gland in place; and a resilient member interposed between the internal shoulder of the retaining means and the shoulder means for resiliently urging the shoulder means toward the driving head thereby tending to maintain the end of the elongate member against the driving head, wherein means are provided for adjusting the relative lateral position between the gland and the surrounding retaining collar.

4. The invention according to claim 3 wherein the shoulder means includes a split collar for engaging the periphery of the elongate member and a collar retainer to maintain the split collar in engagement with the periphery of the elongate member.

5. The invention according to claim 3 wherein the shoulder means includes a member circumferentially arranged about the elongated member and extending outward therefrom in at least some regions.

6. The invention according to claim 3 wherein the resilient member is a Belleville spring.

7. The invention according to claim 3 wherein a deformable insert is provided between the retaining means and the elongate member for aiding in initial alignment of the elongate member between the compression cylinder and the driving head.

* * * * *